United States Patent Office 3,480,878
Patented Nov. 25, 1969

3,480,878
RING LASER WITH MEANS FOR REDUCING COUPLING TO BACKSCATTERED WAVES
Warren M. Macek, Huntington, N.Y., assignor to Sperry Rand Corporation, a corporation of Delaware
Filed Sept. 20, 1966, Ser. No. 580,773
Int. Cl. H01s 3/10
U.S. Cl. 331—94.5                                4 Claims

ABSTRACT OF THE DISCLOSURE

A ring laser including polarization converters positioned adjacent each end of the active lasing medium to render the contra-directionally propagating ring laser modes orthogonally polarized throughout the length of the laser circulatory paths exclusive of that portion wherein the lasing medium is located whereby coupling between each wave and a backscattered component of the oppositely propagating wave is reduced and the mode locking threshold is lowered accordingly.

---

Figure 1:
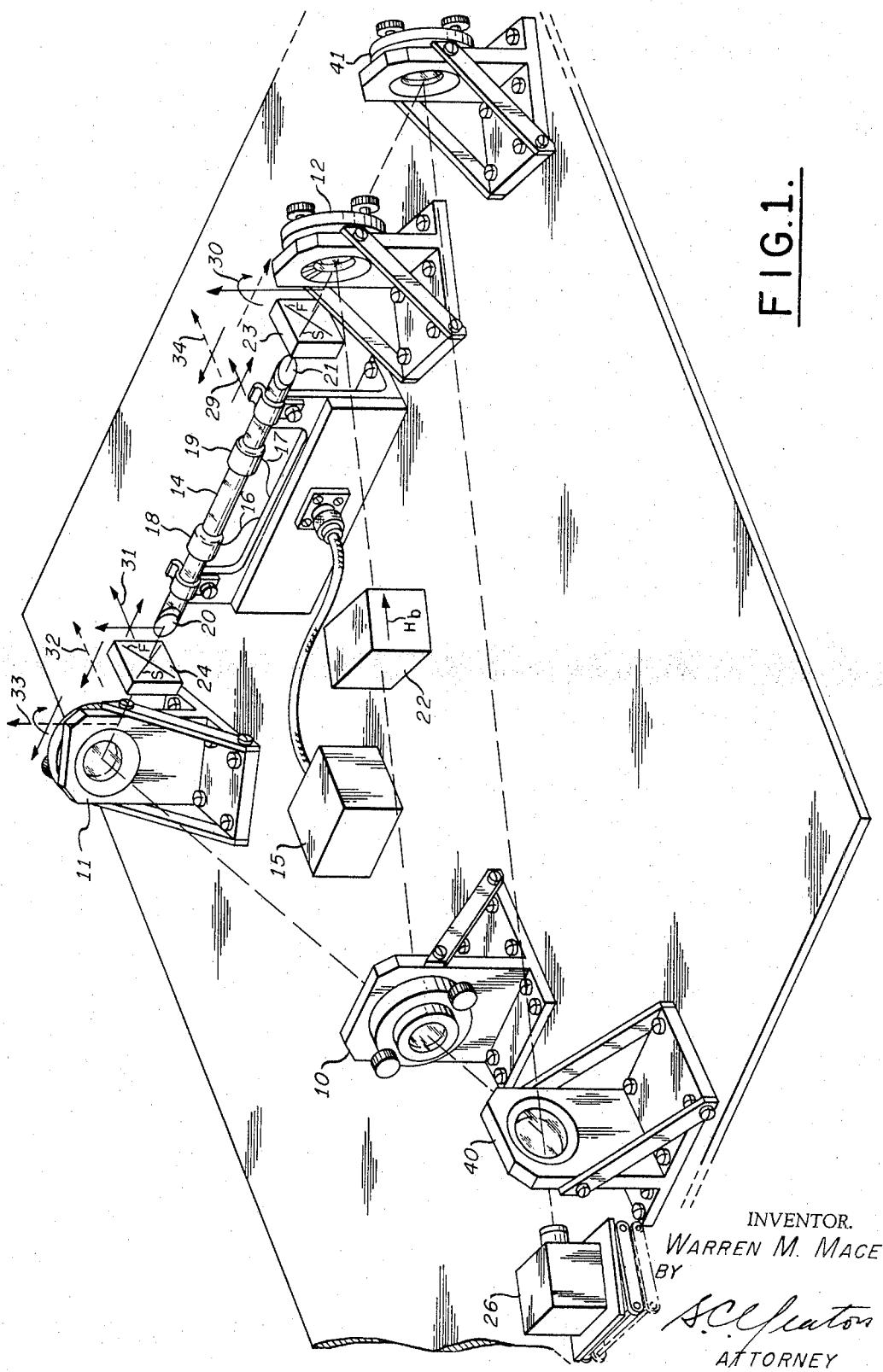

This invention relates to ring lasers and more particularly to means for reducing coupling between the contradirectional coherent light beams propagating in the ring laser.

A ring laser comprises a laser source located in a planar optical cavity formed by three or more highly reflective corner members which direct oppositely propagating light beams emitted by the source around a closed loop path. Any active lasing medium may be used as the laser source but a lasing gas mixture enclosed in a hollow tube has been preferred because of ease in operating such lasers in a continuous wave fashion in the present state of the art. Brewster angle windows are generally used to seal the ends of the hollow tube and determine the polarization of the light waves emitted from the source although other conventional sealing and polarizing means have also been employed. The optical cavity oscillates at those frequencies for which the closed loop optical path length corresponds to an integral number of light beam wavelengths. Therefore, when their optical path lengths are identical, the contradirectional light beams oscillate at the same frequency but for unequal path lengths they oscillate at distinct frequencies separated by an amount proportional to the difference in their path lengths. Rotation of the ring laser about an axis perpendicular to the plane of the closed loop paths is one way of establishing differential path lengths. In this instance the light beam propagating in the direction of rotation must travel a greater distance to arrive back at its starting point in the closed loop path while the oppositely directed beam travels a correspondingly shorter distance. Consequently, the light beam propagating in the direction of ring rotation oscillates at a lower frequency than it did in the absence of rotation because a longer wavelength satisfies the requirement for oscillation. Likewise, the light beam propagating opposite to the direction of rotation oscillates at a higher frequency.

The rotational rate or differential path length is customarily measured by extracting from the ring a small portion of the energy in each light beam by partial transmission through one of the corner members. Combining means external to the ring render the extracted components collinear and direct them to a photodetector wherein they are heterodyned to produce a beat frequency signal proportional to the difference between the frequencies of the light beams. The beat frequency is linearly related to rotation rate for relatively fast rotation but as the rate decreases the relationship eventually becomes non-linear because of coupling, that is, a mutual interaction, between each light beam and a backscattered component of the oppositely propagating beam. Backscattering is always present to some degree but it is effective to produce coupling only at comparatively low rotational rates. Moreover, the coupling usually becomes more pronounced as the optical path length is decreased. When the rotation rate is diminished even further, the coupling ultimately becomes strong enough to cause abrupt cessation of the beat frequency as a result of the contradirectional beams becoming synchronized at the same frequency. This frequency synchronizing phenomenon is referred to as mode locking and the corresponding beat frequency or rotational rate at which it occurs is called the mode locking threshold.

Backscattering is caused by dust particles, interfaces between media of different refractive index and imperfections in the optical components incorporated in the ring. Careful environmental control to eliminate dust and the use of high grade optical components having precision optical surfaces substantially diminishes the backscattering and reduces the mode locking threshold. Even with these refinements, however, the mode locking threshold is too high for many applications. Prior art ring lasers have therefore frequently included means for circumventing the mode locking problem such as a light propagating device which exhibits different propagation constants for light beams having some distinct characteristic difference. One example of such a device is an electric-optic birefringent material having orthogonal principal axes wherein plane polarized light waves aligned parallel to the respective principal axes propagate at different velocities. As a result a nominal differential path length and corresponding beat or bias frequency is established for the light beams even when the ring is stationary. Rotation then either raises or lowers the beat frequency from its nominal value depending upon the sense of rotation. The dynamic operating range of the ring laser as a rotation sensing instrument is thus determined by the difference between the nominal bias frequency and the mode locking threshold. Unfortunately the birefringent material and the accompanying components which establish orthogonality between the orientation of the contradirectional plane polarized beams produce additional backscattering thereby raising the mode locking threshold even higher and decreasing the dynamic operating range proportionately.

It has been observed that for coupling to occur the backscattered component of one light beam and the oppositely propagating light beam must be identically polorized. It has also been observed that the highly coherent light beams emitted by a laser are only slightly depolarized upon being backscattered from a reflecting member with the result that the reflected components of plane polarized and circularly polarized light retain their original polarization except for the sense of the circularly polarized light being reversed, that is, if the incident circularly polarized light is right-handed, it becomes left-handed upon reflection and conversely. Consequently, the propensity for coupling is enhanced if the contradirectional light beams have the same polarization at a common point in the optical cavity. This has indeed been the case in prior art ring lasers because the Brewster angle windows at the ends of the laser tube permit only plane polarized light having a prescribed orientation to propagate through the laser medium. Nevertheless, this mode of operation has been preferred because it not only assures that the optical path lengths of the contradirectional light beams will not be affected by either strain in the Brewster angle windows or random time varying birefringence of the laser medium but also is compatible with the requirement that plane polarized light beams must be polarized either parallel or perpendicular to the plane of the ring to avoid distortion, that is, ellipticity of the polarization, in the light beams reflected from the corner members. In actual practice the perpendicular polarization has usually been preferred because it minimizes energy losses caused by absorption and transmissivity of the corner members. These losses can now be substantially reduced, however, by utilizing multilayer dielectric corner members which produce very low loss for either circularly polarized or vertically or horizontally plane polarized light beams.

It is a principal object of the present invention, therefore, to provide a ring laser wherein the oppositely propagating light beams are polarized relative to each other in such a manner that coupling between them is substantially reduced.

Another object of the invention is to provide a ring laser in which the oppositely propagating light beams are polarized relative to each other so as to reduce the mode locking threshold.

Another object of the invention is to provide a ring laser in which the oppositely propagating light beams are identically plane polarized only during their passage through the laser medium to prevent their closed loop optical path lengths from being differentially affected by either time varying birefringence of the laser medium or strain effects in polarizing members disposed at each end of the lasing medium.

Another object of the invention is to provide a ring laser in which the amplitude of backscattered light transmitted into the laser medium is substantially reduced.

A further object of the invention is to provide a ring laser wherein coupling caused by the use of a combiner mechanism which transmits one of the extracted light beams back into the ring in a direction opposite to its original direction of propagation is substantially reduced.

A still further object of the invention is to provide a ring laser wherein the oppositely propagating light beams are polarized such that each light beam and a backscattered component of the oppositely propagating light beam are orthogonally polarized.

These and other objects of the invention are accomplished by the provision of polarization converters disposed in the path of the oppositely propagating light beams proximate the ends of the lasing medium. Each polarization converter adjusts the polarization of the light beam exciting from the nearby end of the laser medium so that at any common point in the optical cavity, except where the lasing medium is located, each contradirectional light beam and a backscattered component of the oppositely propagating light beam are orthogonally polarized. The polarization converters also readjust the polarization of the light beams re-entering the laser medium so that the contradirectional light beams are identically plane polarized during their passage through the laser medium. In one embodiment of the invention the polarization converters are circular polarizing elements which convert plane polarized light beams to circularly polarized light beams which propagate around the circulatory paths except for that portion between the circular polarizers wherein the laser medium is located. In another embodiment of the invention the polarization converters are optical rotators which rotate the plane of polarization of light incident upon them, thereby converting plane polarized light of one orientation to plane polarized light of a different orientation.

Figure 2:
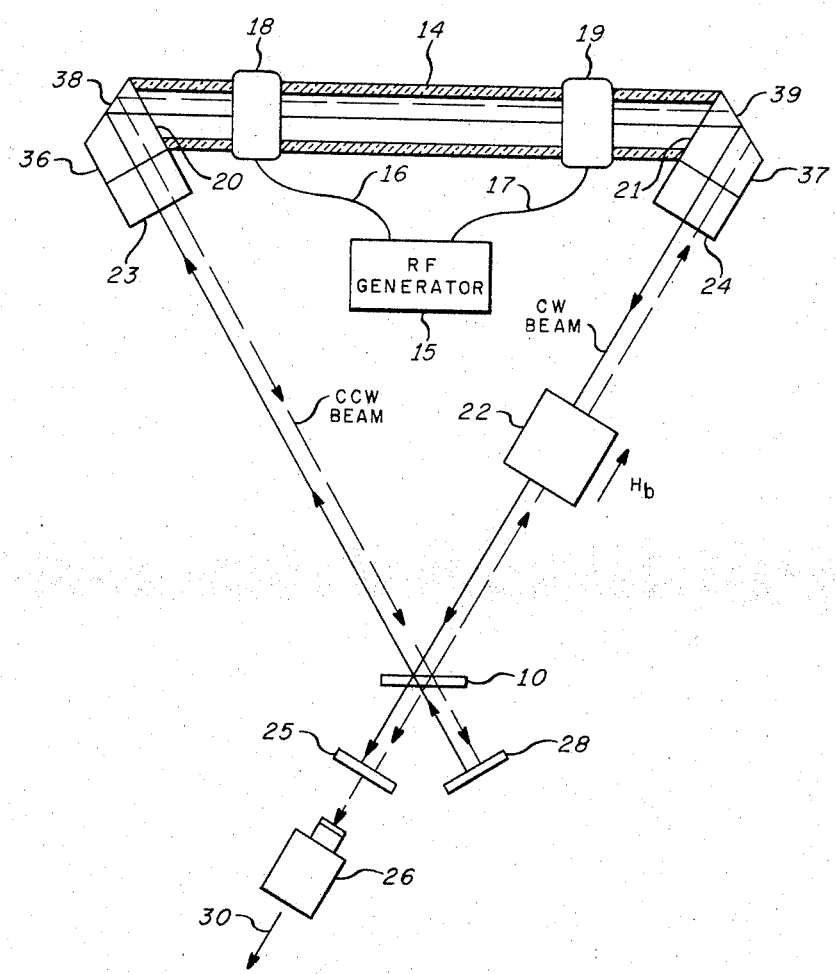
Figure 3:
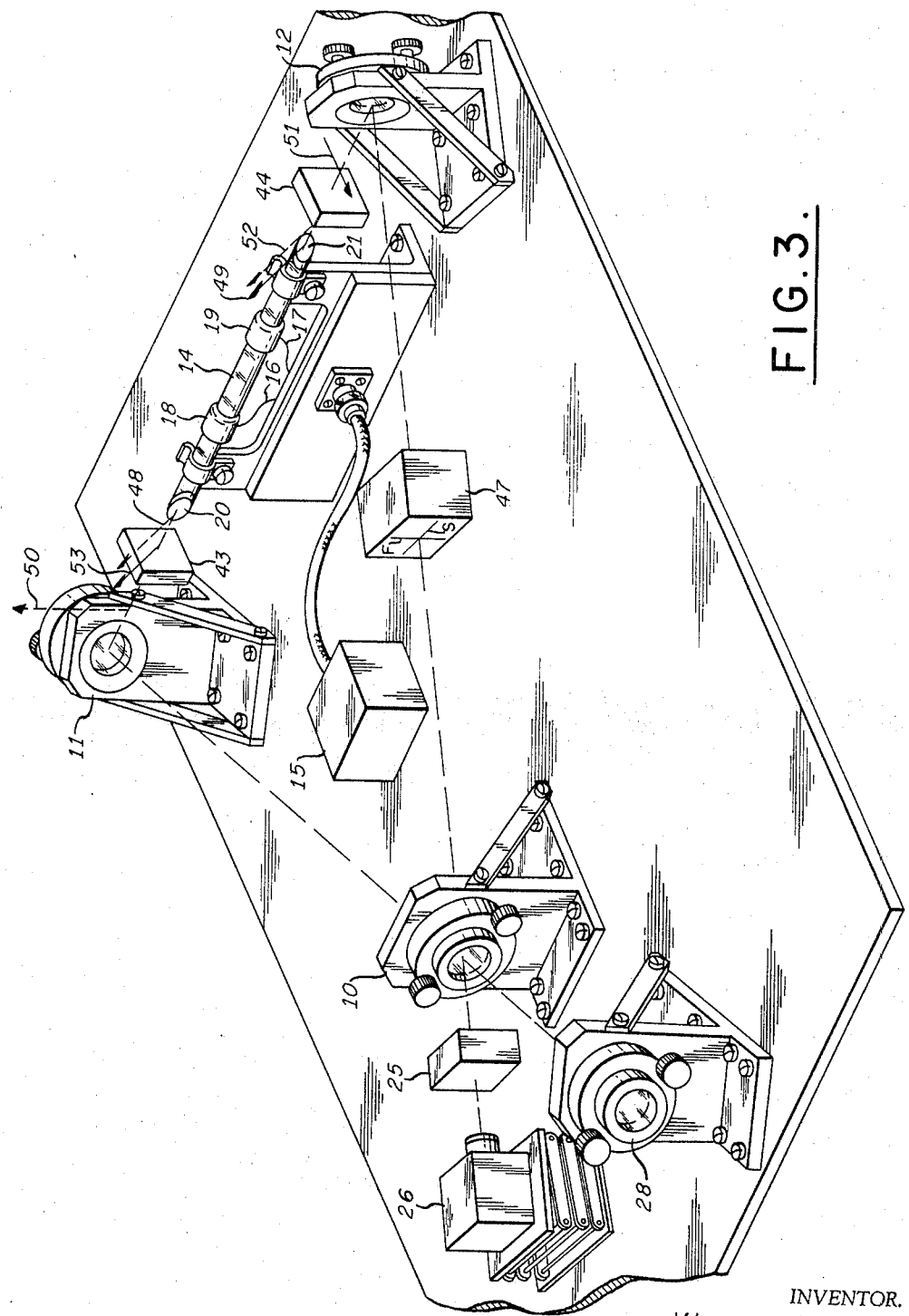

For a more complete understanding of the present invention, reference should be made to the following detailed specification and the accompanying drawings in which common components are identically numbered and wherein:

FIG. 1 is a perspective view of one embodiment of the invention wherein the contradirectional light beams are circularly polarized around the major portion of the circulatory paths;

FIG. 2 is a plan view of an alternative embodiment of the invention propagating circularly polarized light beams around the major portion of the circulatory paths and utilizing a different combiner mechanism; and FIG. 3 is a perspective view of another embodiment of the invention wherein the contradirectional light beams are orthogonally plane polarized around the major portion of the circulatory paths.

Referring to FIG. 1, a planar triangular optical resonant cavity is formed by corner mirrors 10, 11 and 12. A tube 14 containing an active lasting medium such as the standard helium gas mixture is disposed between two adjacent corners. The gas mixture is energized by R.F. generator 15 operating in the frequency range of 20 megacycles per second to 30 megacycles per second, the output signal from the R.F. generator being connected by leads 16 and 17 to the ring electrodes 18 and 19 located near the ends of the tube. Optical flats 20 and 21, which seal the ends of tube 14, are inclined at Brewster's angle relative to the longitudinal axis of the tube to function as polarizers that transmit plane polarized light parallel to the plane of the optical cavity, such light hereinafter being referred to as horizontally polarized. Light beams emitted from each end of tube 14 are successively reflected from each corner mirror causing them to propagate in opposite directions around a common circulatory path wherein they oscillate at the same frequency when their optical path lengths are equal. Since the horizontally polarized light lies in the plane of incidence, the oscillatory light beams retain their polarization upon being reflected from the corner mirrors. The same performance is obtained for plane polarized light having a polarization orientation orthogonal to the horizontally polarized light, such orthogonally oriented plane polarized light hereinafter being referred to as vertically polarized. For any other orientation the plane polarized light becomes elliptically polarized upon reflection from the corner mirrors with the result that its vertically polarized component is strongly attenuated when the light beam re-enters the lasing medium. For this reason the plane polarized contradirectional light beams are usually vertically or horizontally polarized and preferably identically polarized particularly when passing through the laser medium in order to eliminate the possibility of differential path lengths being produced by either random time varying birefringence in the gas mixture or strain in the Brewster angle optical flats as might occur if they were not identically oriented. When the closed loop path lengths are made unequal as by rotation about an axis perpendicular to the plane of the laser cavity, the contradirectional light beams oscillate at different frequencies. It is often desired, however, that differential closed loop path lengths should exist even in the absence of rotation. This not only circumvents the aforementioned coupling problem but also permits the determination of the sense of any other differential path length disturbance.

One specific means for providing a differential circulatory path length comprises a magneto-optic birefringent member 22 operating in conjunction with polarization converters 23 and 24. The polarization converters are circular polarizers, that is, quarter wave optical plates constructed of a naturally birefringent material such as crystalline quartz having orthogonal principal axes F and S oriented normal to the direction of propagation of the contradirectional light beams. Plane polarized light beams polarized parallel to the F axis propagate through the circular polarizers with greater velocity than light beams polarized parallel to the S axis. The thickness of the circular polarizers parallel to the direction of light propagation is such that orthogonal plane polarized light beams which are in time phase and aligned with the principal axes upon entering the circular polarizers are 90 degrees out of time phase upon emerging therefrom so that the emerging light is circularly polarized. To obtain light beam components parallel to both the F and S axis, the circular polarizers are oriented with their principal axes at an angle of 45 degrees relative to the horizontally polarized light beams. The horizontally polarized CW light beam 29 transmitted through optical flat 21 emerges from circular polarizer 23 as right-handed circularly polarized light represented by vector 30; a clockwise rotating light vector looking against the direction of light propagation being designated as right-handed circularly polarized and a similarly observed counterclockwise rotating light vector being designated as left-handed circularly polarized.

Looking at the circular polarizers from a position inside tube 14 the principal axes of circular polarizer 24 are observed to be in space quadrature with the principal axes of circular polarizer 23. Consequently, when the circularly polarized CW light beam propagates through circular polarizer 24 it is converted to horizontally polarized light represented by vector 31. Likewise, the horizontally polarized CCW light beam represented by dashed vector 32 is converted by circular polarizer 24 to left-handed circularly polarized light represented by vector 33 and then by circular polarizer 23 to horizontally polarized light represented by dashed vector 34. Since the handedness of the circularly polarized light beams is reversed each time they experience reflection, the right-handed CW light beam represented by vector 30 becomes left-handed after impinging on mirror 12. Likewise, the left-handed CCW light beam represented by dashed vector 33 becomes right-handed after reflection from mirror 11 and left-handed after reflection from mirror 10. The magneto-optic birefringent member 22 is constructed of glass or other material known to exhibit the classical Faraday effect. A magnetic field H which is applied to the birefringent member parallel to the direction of light propagation by a permanent or electrical magnet (not shown) causes it to exhibit different indices of refraction to the circularly polarized waves for opposite sense of rotation relative to the direction of the magnetic field. Although both the CW and CCW light beams are left-handed circularly polarized when they propagate through birefringent member 22, their polarization vectors rotate in opposite directions relative to the direction of the magnetic field. This causes the closed loop optical path lengths to be different for the oppositely propagating light beams with the result that they oscillate at different frequencies. The ring laser may be operated without birefringent member 22 but irrespective of whether the birefringent member is included in the optical cavity, it should be noticed that at any common point in the optical cavity the polarization of the contradirectional light beams is such that a backscattered component of one light beam will be predominately orthogonally polarized with respect to the oppositely propagating light beam, thus precluding them from coupling since the backscattered components are not transmitted through the optical flats into the lasing medium. The corner mirrors are preferably of multilayer dielectric construction to minimize distortion and energy losses in the circularly polarized light beams.

To obtain a more rigid structure having reduced energy loss the optical cavity may be constructed as shown in FIG. 2 which is identical to FIG. 1 except for the location of circular polarizers 23 and 24 and the inclusion of prisms 36 and 37. Energy loss is reduced by matching the refractive index of the prisms with the refractive index of the optical flats and circular polarizers. In addition, the cavity geometry may be adjusted so that the contradirectional light beams strike the rear surfaces 38 and 39 of prisms 36 and 37, respectively, at an angle greater than the critical angle to produce total internal reflection. In this embodiment, the difference between the frequency of the contradirectional light beams is measured by transmitting a part of the energy in each light beam through corner mirror 10 to a combiner mechanism which renders the transmitted beams collinear and spacially coincident for application to a photodetector wherein they are heterodyned to produce a beat frequency signal proportional to the difference between the frequenices of the light beams. The portion of the CW light beam transmitted through corner mirror 10 propagates directly toward analyzer 25 and onto photodetector 26. The portion of the CCW light beam extracted from the laser cavity impinges on mirror 28 at normal incidence and is reflected back onto corner mirror 10. At corner mirror 10 most of the energy in the extracted CCW light beam is reflected toward analyzer 25 onto photodetector 26 in collinear relationship with the CW extracted light beam but some of the energy is transmitted back into the laser cavity where it propagates opposite to its original direction of travel. Since the portion of the extracted CCW beam which is transmitted back into the cavity is orthogonally polarized with respect to the CW beam propagating therein, the beams do not couple. Hence, the propagation of appropriately oriented circularly polarized light beams around a major portion of the ring reduces not only coupling caused by internal backscatter but also that produced by the use of a simple combiner mechanism. Analyzer 25 is included to sample identically polarized components of the extracted light beams because the photodetector cannot respond to orthogonal circularly polarized beams.

A slightly different combiner mechanism is utilized in the embodiment of the invention illustrated in FIG. 1. The CCW light beam is extracted from the optical cavity by partial transmission through mirror 10 so that it impinges on beam splitter 40 and is reflected onto photodetector 26. The CW beam, however, is extracted by partial transmission through mirror 12 whereupon it is reflected from mirror 41 onto beam splitter 40 so that the component transmitted through the beam splitter is in collinear relaionship with the extracted CCW light beam for application to photodetector 26 wherein they are heterodyned to produce a beat frequency signal proportional to the difference between the frequencies of the contradirectional light beams. Since the handedness of the circularly polarized light beams reverses upon reflection but remains unchanged for transmission through an object, the collinear light beams are both left-handed circularly polarized and therefore a sampling analyzer is not required for heterodyning.

Refer now to FIG. 3 which is identical to FIG. 1 except that the Brewster angle optical flats have a different orientation and different elements are used for the polarization converters and birefringent member. Polarization converters 43 and 44 are Faraday rotators, which are similar to the magnetooptic birefringent member 22 of FIG. 1 except that they are designed specifically to provide 45 degree rotation of a plane polarized light beam propagating through them. The birefringent member 47 may have either natural or electrically induced birefringence relating to orthogonal principal axes as in the quarter waveplates operating as circular polarizers in FIG. 1. Tube 14 is positioned so that the plane polarized CCW and CW light beams transmitted through optical flats 20 and 21 are oriented as shown by dashed vector 48 and vector 49 respectively. The CCW light beam 48 is rotated 45 degrees by Faraday rotator 43 causing it to become vertically polarized as indicated by dashed vector 50. Similarly, CW light vector 49 is rotated 45 degrees by Faraday rotator 44 causing it to become horizontally polarized as indicated by vector 51. Birefringent member 47 is oriented with its principal axes aligned parallel respectively to the horizontally and vertically polarized light beams thereby establishing a differential path length for the contradirectional light beams even when the optical cavity is stationary. When the CCW light beam propagates through rotator 44 its plane of polarization is rotated 45 degrees to the position of dashed vector 52 enabling it to transmit through optical flat 21. Likewise, the CW light beam is rotated 45 degrees by rotator 43 to the position shown by vector 53, thus enabling it to transmit through optical flat 20. It should be noted that around all positions of the circulatory path, except in the region between the rotators wherein the lasing medium is located, the light beams are orthogonally plane polarized. Therefore, as explained hereinbefore a backscattered component of one beam will not couple to the oppositely propagating beam. The combiner mechanisms shown in FIGS. 1 and 2 as well as other known combiners may be used to measure the difference between the frequencies of the contradirectional light beams. Since the orthogonal plane polarization of the light beams avoids the aforementioned external backscattering problem described with reference to FIG. 2, the simple combiner of that embodiment is generally preferred because it is easier to construct and align. In this instance, since the light beams are plane polarized, the transmission axis of analyzer 25 must be oriented at an angle of 45 degrees with respect to the plane of polarization of the extracted light beams.

It should be recognized that refracting elements may be used in place of the reflecting members to direct the light beams around circulatory paths and a part or all of the optical path lengths may be curved or made nonplanar if desired. In addition, the gaseous lasing medium may be excited by a D.C. power source or other known lasing media may be employed.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In an optical device having two light beams propagating in opposite directions in circulatory paths, means for constructing and operating said device to minimize adverse effects caused by backscattered light within said circulatory paths comprising the combination
    (a) means for forming a closed loop optical cavity,
    (b) a laser source for generating contradirectional light beams propagating in opposite directions around circulatory paths defined by said optical cavity,
    (c) polarization converters disposed in said circulatory paths proximate each end of said laser source such that the distance between said polarization converters in a direction through said source constitutes a minor portion of the circulatory path lengths, said polarization converters each operating to adjust the polarization of the light beam incident thereon from the adjacent end of said source so that at a common point in said circulatory paths exclusive of said minor portion each light beam and the predominate portion of a backscattered component of the oppositely propagating light beam are orthogonally polarized relative to each other and further operating to readjust the polarization of the adjusted contradirectional light beams such that they are identically plane polarized in said minor portion, and
    (d) means for extracting from said optical cavity a portion of the energy in each of said contradirectional light beams to provide first and second extracted light beams.

2. The combination claimed in claim 1 and further including means disposed in said circulatory paths for establishing a difference in the circulatory path lengths of said contradirectional light beams.

3. The combination claimed in claim 1 and further including polarization analyzing means disposed external to said circulatory paths, means for directing said first and second extracted light beams onto said polarization analyzing means in collinear relationship, and photodetector means responsive to the light transmitted through said polarization analyzing means for heterodyning said extracted beams to produce a signal representative of the frequency difference therebetween.

4. The combination claimed in claim 1 wherein said means for extracting the contradirectional light beams is a first partially transmissive member for extracting said first extracted light beam and a second partially transmissive member for extracting said second extracted light beam, said first and second partially transmissive members comprising a part of said optical cavity forming means.

References Cited

UNITED STATES PATENTS 3,382,758   5/1968   Wang _____ 331—94.5 X

OTHER REFERENCES

Collins et al., Applied Optics, vol. 3, November 1964, pp. 1314–1315 (331–94.5).

Smith et al., IEEE Proc., February 1965, p. 161, (331–94.5).

ROY LAKE, Primary Examiner

S. H. GRIMM, Assistant Examiner

U.S. Cl. X.R.

356—106